(12) United States Patent
Scherer et al.

(10) Patent No.: US 9,816,629 B2
(45) Date of Patent: Nov. 14, 2017

(54) PRESSURE CONTROL VALVE

(71) Applicant: SVM Schultz Verwaltungs—GmbH & Co. KG, Memmingen (DE)

(72) Inventors: Georg Scherer, Kirchheim (DE); Helmut Mang, Memmingen (DE)

(73) Assignee: SVM Schultz Verwaltungs—GmbH & Co. KG, Memmingen (DE)

( * ) Notice: Subject to any disclaimer, the term of this patent is extended or adjusted under 35 U.S.C. 154(b) by 0 days.

(21) Appl. No.: 14/329,140

(22) Filed: Jul. 11, 2014

(65) Prior Publication Data

US 2015/0013801 A1 Jan. 15, 2015

(30) Foreign Application Priority Data

Jul. 12, 2013 (DE) ........................ 10 2013 107 389

(51) Int. Cl.
| | |
|---|---|
| F16K 15/18 | (2006.01) |
| F16K 1/34 | (2006.01) |
| F16K 31/02 | (2006.01) |
| F16K 1/54 | (2006.01) |
| F16K 31/06 | (2006.01) |

(52) U.S. Cl.
CPC .............. *F16K 15/183* (2013.01); *F16K 1/34* (2013.01); *F16K 1/54* (2013.01); *F16K 31/02* (2013.01); *F16K 31/0634* (2013.01); *Y10T 137/86686* (2015.04); *Y10T 137/88054* (2015.04)

(58) Field of Classification Search
CPC ........ F16K 15/183; F16K 31/06; F16K 31/02; F16K 31/0634; F16K 1/34; F16K 1/38; F16K 1/54; F16K 11/056; F16D 48/02; G05D 16/2013; G05D 16/2033; Y10T 137/87217; Y10T 137/87209; Y10T 137/8667; Y10T 137/86678; Y10T 137/86686; Y10T 137/86622
USPC .............. 137/596.17, 596.16, 625.2, 625.25, 137/625.64, 625.65, 625.26, 625.27
See application file for complete search history.

(56) References Cited

U.S. PATENT DOCUMENTS

| | | | | |
|---|---|---|---|---|
| 2,255,404 A | * | 9/1941 | White | F04B 53/1027 137/516.25 |
| 5,103,866 A | * | 4/1992 | Foster | F15B 13/0405 137/596.15 |
| 5,651,391 A | * | 7/1997 | Connolly | F15B 13/0405 137/454.6 |
| 5,996,606 A | * | 12/1999 | Iwasaki | E03B 7/07 137/110 |
| 6,109,301 A | * | 8/2000 | Pfetzer | B60H 1/00485 137/599.14 |
| 7,377,758 B2 | * | 5/2008 | Sallows | A47K 5/1204 251/327 |

(Continued)

*Primary Examiner* — Kevin Murphy
*Assistant Examiner* — Kelsey Rohman
(74) *Attorney, Agent, or Firm* — Goodwin Procter LLP

(57) ABSTRACT

The invention relates to a pressure control valve having a control element that includes a valve component and a drive component. The valve component include an orifice that, in a first position, may be closed by the control element, disconnecting a control chamber from a return chamber, such that a control pressure acts on a first control surface of the control element and in a second position, the orifice may be partially opened, so that the control and return chambers are fluidically connected to each other, such that the control pressure in the control chamber acts on a second control surface of the control element.

21 Claims, 2 Drawing Sheets

(56) References Cited

U.S. PATENT DOCUMENTS

| | | | |
|---|---|---|---|
| 7,958,908 B2* | 6/2011 | Cho | F04B 27/1804 137/625.26 |
| 2002/0104571 A1* | 8/2002 | Hess | F16K 1/44 137/625.29 |
| 2004/0089353 A1* | 5/2004 | Soga | F15B 13/044 137/596.17 |
| 2005/0199840 A1* | 9/2005 | Brinks | F16K 1/38 251/124 |
| 2007/0023092 A1* | 2/2007 | Yamamoto | F16K 11/048 137/625.27 |

* cited by examiner

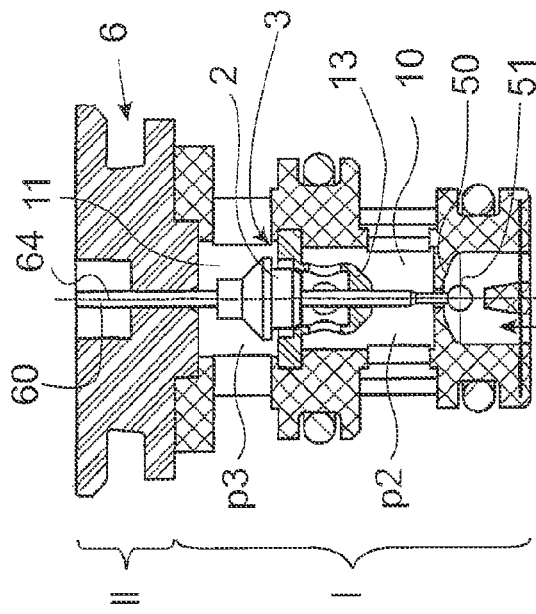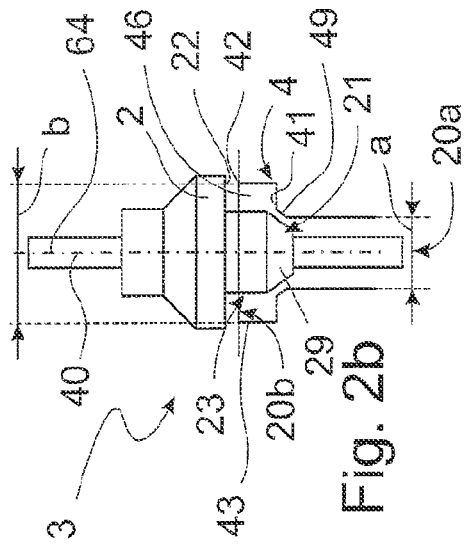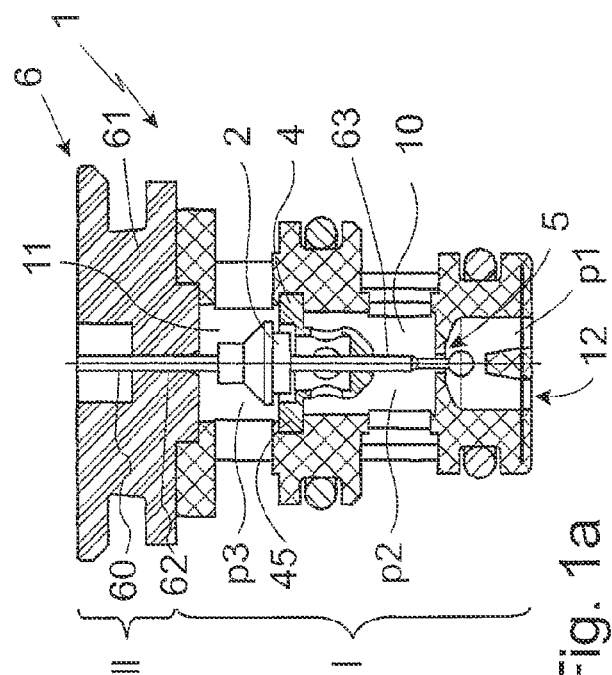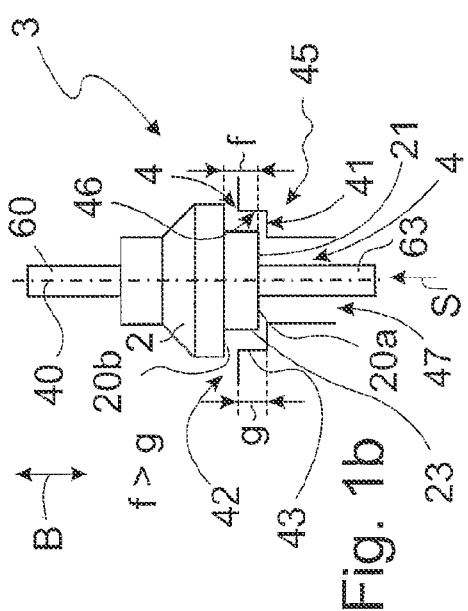

PRESSURE CONTROL VALVE

CROSS REFERENCE TO RELATED APPLICATION

This application is a filing of German Patent Application No. 10 2013 107 389.1, filed Jul. 12, 2013, which is hereby incorporated by reference in its entirety.

BACKGROUND

The invention relates to a pressure control valve composed of a valve component and a drive component for the control element of the valve component; the valve component has an orifice that is closed by the control element in a first position, thus disconnecting a control chamber from a return chamber and during operation, a control pressure prevails in the control chamber that is greater than or equal to the return pressure in the return chamber.

The invention also relates to a pressure control valve composed of a valve component and a drive component for the control element of the valve component; the valve component has an orifice that, depending on the position of the drive component and the control element operatively connected to it, is closed by the latter or is at least partially opened for pressure control purposes.

SUMMARY

Pressure control valves of this generic type are used, for example, for transmission control, in particular for controlling the shifting process in automatic transmissions of motor vehicles.

The object of the present invention is to improve the known pressure control valves with a view to a more pleasant shifting comfort of the automatic transmission.

In order to attain this object, the invention starts with a pressure control valve of the type described at the beginning and starts by proposing a pressure control valve that is composed of a valve component and a drive component; the valve component has an orifice that is closed by the control element in a first position, thus disconnecting a control chamber from a return chamber and during operation, a control pressure prevails in the control chamber that is greater than or equal to the return pressure in the return chamber. According to the invention, it is now provided that in the first position, the control pressure acts on a first control surface of the control element and in a second, controlled position, the orifice is partially opened so that the control chamber and the return chamber are fluidically connected to each other and the control pressure prevailing in the control chamber in the second position acts on a second control surface of the control element and the second control surface is larger than the first control surface.

The object described above is also attained by means of a pressure control valve, which can be embodied as described above in a variant in which the pressure control valve is composed of a valve component and a drive component; the valve component has an orifice that, depending on the position of the drive component and the control element operatively connected to it, is closed by the latter or is at least partially opened for pressure control purposes. According to the invention, the control element in this case has at least two control element regions spaced apart from each other, i.e. a first control element region and a second control element region, with different respective cross-sectional areas. In the direction of the longitudinal axis of the orifice, the orifice has at least two orifice regions spaced apart from each other, a first orifice region and a second orifice region, with different respective cross-sectional areas. When the orifice is closed, the first control element region protruding into the orifice cooperates with the first orifice region. The second control element region cooperates with the second orifice region to control the pressure.

In the context of the present invention, the expression "control element regions spaced apart from each other" is understood to be an arrangement of different control element regions in the flow direction of the fluid that flows through the pressure control valve and is to be controlled, e.g. a hydraulic fluid or other fluid medium. In this case, this arrangement that is spaced apart in the flow direction at least essentially corresponds to the direction of the longitudinal axis of the orifice; the longitudinal axis of the orifice is a perpendicular to the sealing surface or to the orifice ring of an imaginary sealing surface that encompasses the orifice.

The special feature of the invention underlying these design proposals is that in the pressure control region in which the control element has lifted away from the orifice seat, depending on the position of the control element relative to the orifice seat, a different effective control surface of the control element interacts with the control pressure. The control force produced by the action of the control pressure on the control surface counteracts the force provided by the drive component (for example an electromagnet).

In the low pressure region (the control element has lifted away from the orifice seat), the large control surface produces a flat characteristic curve. This results in a high current and pressure resolution. In the high current range, a higher output pressure is produced via the smaller control area.

Often and particularly in a variant according to the invention, the pressure control valve according to the invention is electromagnetically actuated; in an application of this kind, a drive component in the form of an electromagnet is provided, whose armature rod is connected to the control element and/or is operatively connected to it. An electromagnetically actuatable pressure control valve produces a control pressure as a function of the supplied current. The desired effect is achieved with a suitable selection of the hydraulically effective components.

The above-mentioned advantageous embodiments achieve the fact that in the lower current/pressure range, the pressure control valve according to the invention enables sensitive control of the clutches of an automatic transmission and with a high current, permits a high control pressure for transmitting more powerful torques at the clutches.

The arrangement here is selected so that at high control pressures, the control chamber is disconnected from the return chamber and as a result, the medium that is to be controlled—e.g. hydraulic fluid—cannot flow out via the return chamber and thus no pressure reduction occurs. In the pressure control region, i.e. in a position of the control element relative to the orifice such that according to the invention, the control pressure acts on a larger area, the orifice is used to produce a pressure division or pressure reduction, which, depending on the position of the control element, yields comparatively low pressures.

This embodiment of the invention suitably generates a progressive pressure control curve during operation of the pressure control valve according to the invention. The otherwise favored linear relationship between the starting current and the control pressure is suitably altered here in order to attain the object of the invention.

One example of a progressive pressure control curve is a curve of the control pressure relative to the electrical current through the coil of the electromagnet, as shown by the solid line in FIG. 3. Here, the linear relationship is depicted with a dashed line; with a progressive embodiment, the value of the first derivative of the graph increases with increasing current or the second derivative is greater than zero (in a linear relationship, the second derivative is equal to zero).

The embodiment according to the invention can be described in the following additional analogous model in order to depict the functionality according to the invention even more clearly. An essential special feature of the invention lies in the fact that instead of one throttle region in the orifice, (at least) two throttle regions are suitably integrated into the design. As a result, the larger control surface is defined by an addition of the smaller control surface (when the orifice is closed) and the partial surface that is additionally effective when the orifice is partially open. As defined by the invention, the control pressure in this context is also understood according to the invention to be a possibly partial, i.e. spatially separate, control pressure because it is quite possible for a first working pressure to act on the first or "smaller" control surface and for a pressure that is slightly reduced relative to this to act on the second partial surface (which is also spaced apart from the first partial surface) since the throttling action of the first region (first orifice region) must be taken into account. This differentiated consideration is included in the term "control pressure," as defined and used according to the invention.

There are several advantageous variants for the embodiment of the pressure control valve according to the invention. In a first embodiment, a section that has a uniform cross-sectional area is provided between the first and second control element regions or between the first and second orifice regions. Such an embodiment yields an intermediate orifice region that corresponds to an inner circumference surface of a cylinder, whereas such an embodiment on the control element corresponds to a prismatic intermediate control element region with a circular cross section.

Alternatively to this, it is also possible for the first and second control element regions or orifice regions to adjoin each other and for them to be characterized by an abrupt, discontinuous change in the cross-sectional area.

In this case, the first control element region corresponds to the first control surface and the second control element region corresponds to the second control surface; these control surfaces are spaced apart from each other in this variant, without restricting the invention to such an embodiment.

In another improvement of this invention, it has been discovered that by means of the orifice region spacing on the one hand and the control element region spacing on the other, it is possible to vary and optimize the characteristic curve of the control pressure/current curve (when an electromagnet is used as the drive component).

The orifice region spacing in this case is understood to be the distance between the first orifice region and the second orifice region. The control element region spacing is the distance between the first control element region and the second control element region. This has suitably led to the discovery that the control element region spacing is greater than the orifice region spacing.

In another preferred embodiment, it has been discovered that the ratio of the control element region spacing to the orifice region spacing is preferably between 1 and 3, particularly between 1 and 2, and especially preferably between 1.2 and 1.4.

In another preferred embodiment, other favorable region intervals are defined, as described below:

The lower interval limit of the ratio of the control element region spacing to the orifice region spacing is 1, 1.05, 1.1, 1.15, 1.2, 1.25, or 1.3.

The upper limit of the interval in the ratio of the control element region spacing to the orifice region spacing is optionally 1.2, 1.25, 1.3, 1.35, 1.4, 1.45, 1.5, 1.55, or 1.6.

Any combination of the above mentioned upper and lower interval limit is included within the scope of disclosure of this invention and has therefore been disclosed by it.

According to the invention, the embodiment of the orifice regions is likewise very variable. It is possible to provide any known shape of seat for the embodiment of the orifice region, for example including disk-shaped or flat seats as well as the embodiment of an orifice region with a conical seat.

Consequently according to the invention, a disk-shaped or flat seat or a conical seat, for example, is provided at an orifice.

As a result of this, the control element region or control element can be embodied in the form of a valve disk and in another variant, the pressure control valve according to the invention alternatively provides a valve cone or truncated valve cone for the embodiment of the control element region or control element.

It is clear that the embodiment of the control element corresponds to the embodiment of the orifice, even though it can also alternatively deviate from it, particularly in order to optimize the pressure control characteristic curve, for example a truncated cone serving as the control element region cooperates with a disk-shaped or flat seat in the orifice region.

Naturally, the control element is embodied in a suitable fashion on the side oriented away from the orifice; for example, a disk-like or cone-like or truncated cone-like embodiment can nevertheless be provided here, even though in this case, an embodiment of this region of the control element oriented away from the orifice has no influence on the functionality of the invention since this region is not embodied to cooperate directly with an orifice.

In another embodiment of the invention, it has been discovered that the internal width or diameter of the second orifice region forms a ratio of at least 1.4 with the internal width or diameter of the first orifice region. This ratio is preferably greater than 1.4, for example 1.5, 1.6, 1.8, 2.0, 2.2, 2.5, or 3.

For the embodiment of the valve component of the pressure control valve according to the invention, preferably a metal is provided; in particular, steel or brass can be used for this. Alternatively, the valve component of the pressure control valve according to the invention can also be composed of plastic, in particular a plastic that is not attacked by the fluid or medium used. Naturally, an arrangement of different materials can also be provided in the valve component. For example, the orifice can be composed of a harder material than the control element.

The drive component (in particular the armature rod) of a pressure control valve according to the invention is likewise at least partially composed of metal, for example; in particular, steel or brass can be used for this. In a variant according to the invention, however, the drive component can also be at least partially composed of plastic.

The pressure control valve according to the invention is often also embodied with two stages; in this case, the valve component is provided with another sub-valve, which in its closed position, disconnects the control chamber from a connection. In this connection, the arrangement is often selected so that if the electromagnet falls off or the drive component is switched off, the control element that is moved by the drive component is moved far enough away from the orifice that the latter is opened all the way and a complete pressure drop from the control chamber in the direction of the return chamber would be produced, which is not desirable and in this case, the first sub-valve, which disconnects the connection or inlet from the control chamber, is closed. It is clear that the sub-valve is situated upstream of the orifice in the flow direction of the medium. In this case, the connection pressure prevails in the connection or inlet.

Wherever the terms control chamber and return chamber are used in this application, these terms are used as follows in the context of this application.

On the one hand, the terms "control chamber" and "return chamber" distinguish two different chambers, without interpreting the function of the control or the function of the return that takes place in this chamber; in other words, the choice of words clearly draws a distinction between these two chambers. In another interpretation, however, the term "control chamber" also defines the function-related meaning, namely that the control chamber is connected to an element to be controlled and transmits the control pressure that has been set in the control chamber to this element, for example a hydraulic element. In the same way, the term "return chamber" can likewise be interpreted to have an additional meaning, namely that the return chamber is or can be connected to a collecting chamber or return receptacle.

DESCRIPTION OF DRAWINGS

The drawings schematically depict the invention and in particular an exemplary embodiment thereof. In the drawings:

FIGS. 1a and 2a each show a sectional depiction of a different exemplary embodiment of the pressure control valve according to the invention, FIGS. 1b and 2b each show an enlarged view of a detail of the pressure control valve according to the invention from FIGS. 1a and 2a, respectively.

DETAILED DESCRIPTION

Figure 3:
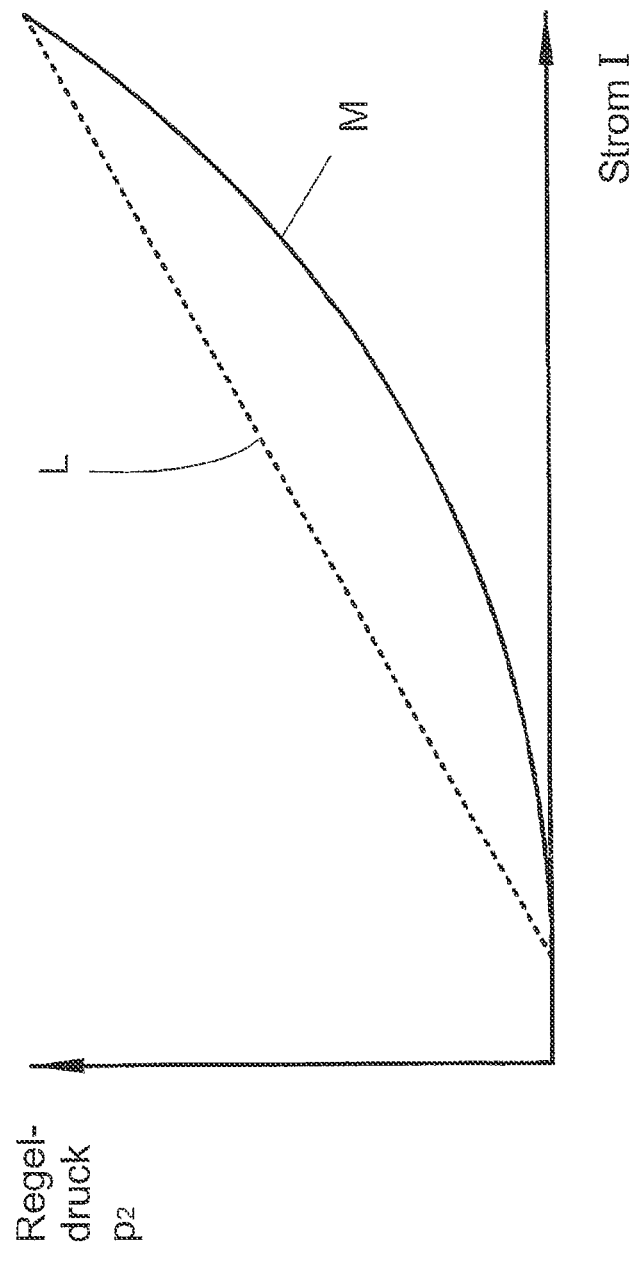
FIG. 3 shows the control pressure/current characteristic curve of the electromagnetically actuated pressure control valve according to the invention.

In the drawings, elements that are the same or that correspond to one another are respectively labeled with the same reference numerals and are thus not described again, where advisable. The basic design of the pressure control valve according to the invention 1 is in particular shown in FIGS. 1a and 2a.

The pressure control valve 1 is composed of a valve component I and a drive component II. The drive component II is used to move the control element 2 of the valve component I.

The drive component II is for example embodied in the form of an electromagnet, resulting in the electromagnetically actuated pressure control valve 1 that likewise falls within the scope of the invention.

The electromagnet 6 that constitutes the drive component II in this exemplary embodiment is depicted only partially in FIGS. 1a and 2a and has a typical design such that in an armature chamber, an armature, which is composed of magnetizable material, is supported so that it can be moved by an electromagnetic field, which can be produced by a coil, preferably in opposition to the force of a return spring. The electromagnet 6 is delimited by a magnet core 61, which in particular serves to guide the magnetic field.

In this case, the armature rod 60 is either connected to the armature or is operatively connected to it so that the movement of the armature is reliably transmitted to the armature rod 60.

The same is also true for the connection of the armature rod 60 to the control element 2. The arrangement is selected so that the magnet core 61, which is part of the electromagnet 6, has a through opening 62 through which the armature rod 60 extends out from the magnet core 61 in a downward direction in the exemplary embodiment shown here and protrudes into the valve component I of the pressure control valve 1.

In particular, the armature rod 60 is supported in the through opening 62 of the magnet core 61, in particular, is supported to permit an axial movement.

At its end oriented away from the electromagnet 6, the armature rod 60 is connected to or operatively connected to the control element 2, which is a component of the valve component I; instead of a rigid connection, this can, for example, be implemented in the form of a loose, but for example spring-loaded connection. Both of the variants mentioned above fall within the scope of the invention.

The pressure control valve 1 in the exemplary embodiment shown in FIG. 1a or 2a has a two-stage design in its valve component I. At the connection 12, the medium to be controlled or regulated—usually a liquid such as hydraulic fluid or the like—is supplied at a connection pressure p1. The connection 12 is restricted or limited in the flow direction of the medium from the sub-valve 5. The sub-valve 5 in this case is composed of a sub-valve orifice 50, which is embodied as a through bore, and a closure element 51, which closes or opens the sub-valve orifice 50 and in the embodiment shown here, is embodied in the form of a closing ball.

The arrangement here is selected so that the closure element 51 in the connection 12 is pressed against the seat of the sub-valve orifice 50 by the connection pressure p1 and an action in opposition to the closing force that results from this must be exerted in order to lift it away from the seat of the sub-valve orifice 50. This opening force is transmitted by a slider 63, which on the end oriented away from the connection 12—viewed in the flow direction S—or in the adjoining control chamber 10, is guided to the sub-valve orifice 50, protrudes through it, and is thus able to act on the closure element 51.

The slider 63 here is operatively connected to the drive component II, for example the electromagnet 6. For example, it is embodied of one piece with the armature rod 60, without restricting the invention to such an embodiment; it is also possible to provide a separate drive for the slider 63, although the integrated embodiment of the slider 63 in the armature rod 60 predetermines a mechanically coupled position, which significantly facilitates the control and regulation of the pressure control valve as a whole.

The sub-valve 5 is then closed when the slider 63 no longer acts on the closure element 51 so that the latter is lifted away from the seat of the sub-valve orifice 50. This position results in the fact that the control element 2 in turn is spaced apart from the orifice 4 so that this control valve 3 is opened.

In the closed position of the sub-valve 5, the closure element 51 is pressed against the sub-valve orifice 50 because of the connection pressure p1 that prevails in the connection 12.

In the flow direction S, the control chamber 10 is connected downstream of the connection 12 and downstream of the sub-valve 5 and its sub-valve orifice 50.

The control chamber 10 is fluidically connected to the component to be controlled, for example to the clutch of an automatic transmission.

In the control chamber 10, the control pressure p2 prevails, which occurs due to the position of the control element 2 relative to the orifice 4 of the second sub-valve component in the flow direction S, described here as the control valve 3.

The control valve 3 is composed of an orifice 4, which is rigidly mounted or stationary in the pressure control valve 1, and the control element 2, which can be positioned relative to the orifice 4 in accordance with the position of the armature rod 60 and/or the drive component II and thus permits a variable pressure divider to adjust or regulate the control pressure p2.

In the exemplary embodiment shown here, the slider 63, which is used to actuate the sub-valve 5, is embodied of one piece with or is rigidly embodied together with the armature rod 60, for example in a single manufacturing step. As a result, the slider 63 extends through the control chamber 10 from the orifice 4 of the control valve 3 into the sub-valve orifice 50 of the sub-valve 5. To support the slider 63 in the control chamber 10, a bearing element 13 is therefore provided, which in the exemplary embodiment shown here, is connected to the orifice 4; it can, however, also be supported in the wall surrounding the control chamber 10.

As has already been explained, the control pressure p2 is controlled by setting the pressure drop via the control valve 3 and/or the orifice 4.

In this case, the control valve 3 and the orifice 4 disconnect the control chamber 10 from a return chamber 11; preferably, the return chamber 11 is simultaneously connected to a collecting receptacle or reservoir for the medium, in particular the hydraulic fluid; the return pressure p3 prevails in the return chamber 11.

The movement of the control element 2 now occurs parallel to the movement direction of the armature rod 60, which in turn is moved parallel to its longitudinal axis 64 by the drive component II/electromagnet 6.

In the exemplary embodiment shown here, the longitudinal axis 64 is at least parallel, if not in fact identical, to the longitudinal axis 40 of the orifice.

FIGS. 1b and 2b show the design of the control valve 3 in detail, in particular the cooperation of the control element 2 with the orifice 4 according to the invention.

FIG. 1b shows the orifice 4. It is composed of a through opening 47, which passes through the orifice element 45. The through opening 47 is also described by the longitudinal axis 40 of the orifice, which constitutes its central axis, for example. The flow direction of the medium is labeled with the reference letter S. In the flow direction S, the through opening 47 initially has a first, smaller diameter and/or cross-section; at the upper end, this is then adjoined by an annular shoulder 46, which leads to a corresponding widening to the diameter b. With reference to the flow direction S, the control element 2 cooperates with the orifice 4 from the rear; in this case, the pressurized medium tries to lift the control element 2 away from the orifice 4 (by contrast with the situation in the sub-valve 5); the drive component II is provided for this purpose and exerts the necessary adjusting force.

In the direction opposite from the flow direction S, the control element 2 is adjoined by the slider 63, which extends through the through opening 47 in the direction of the control chamber 10.

This annular shoulder 46 forms two orifice regions 41, 42 that are distanced or spaced apart from each other in relation to the longitudinal axis 40 of the orifice; the first orifice region in the flow direction S is labeled with the reference numeral 41 and the second orifice region is labeled with the reference numeral 42. These orifice regions 41, 42 cooperate with corresponding control element regions 21, 22 of the control element 2; in the example shown here, these orifice regions 41, 42 are embodied in the form of ring-like surfaces oriented at right angles to the orifice axis 40, without restricting the invention to such an embodiment.

The orifice regions 41, 42 are embodied as disk-shaped or flat seats. In this case, the first orifice region 41 is not provided at the edge of the orifice, but inside the orifice, at the annular shoulder 46 and has a smaller diameter or internal width a than the second orifice region 42, which is situated at the terminal edge of the orifice.

Corresponding with the embodiment of the orifice 4 with the first and second orifice region 41, 42, the control element 2 shown in in FIG. 1b also has a first and second control element region 21, 22. In the exemplary embodiment shown in FIG. 1b, both of the control element regions 21, 22 are embodied as valve disks; in other words, the control element regions 21, 22 that cooperate with the first and second orifice regions 41, 42 are likewise embodied as annular surfaces that are oriented essentially at right angles to the longitudinal axis 40 of the orifice and the movement direction B of the control element 2. The first control element region 21 in the flow direction S in this case has a smaller diameter than the second control element region 22 situated downstream of it in the flow direction S; both of them are embodied as disk-shaped or cylindrical and function as valve disks.

Between the two control element regions 21, 22, there is a section or an intermediate control element region 23, which is embodied as cylindrical and, which is determined by means of the thickness of the valve disk, the front end of which (relative to the flow direction S), constitutes the control element region 21. The height or thickness of this intermediate control element region 23 is also described as the control element region spacing f.

The two orifice regions 41, 42 are also spaced apart from each other by an intermediate orifice region or section 43, which is depicted in FIGS. 1b and 2b in the form of cylindrical inner surfaces with constant diameters.

Whenever this application speaks of the cooperation of the control element regions 21, 22 with the associated orifice regions 41, 42, this is understood (in particular, but not exclusively) to mean the following:

Naturally, the cooperation of the control element regions 21, 22 with the orifice regions 41, 42 is first understood to mean a sealing, i.e. a closing, of the control valve 3. The question of which control element region 21, 22 comes into closing contact with the orifice region 41, 42 ultimately depends on the embodiment of the geometry of the control element region spacing f and the orifice region spacing g. The control element region spacing f in this case is defined such that the two control element regions 21, 22 are spaced apart from each other in the direction of the longitudinal axis 40 of the orifice and thus cooperate at different times and in different ways with the associated, cooperating orifice regions 41, 42.

In addition to the closing of the control valve 3 by the cooperation of the corresponding control element regions 21, 22 with the orifice regions 41, 42, however, a cooperation also takes place by means of a throttling action, which occurs when the flow cross-section is narrowed by the cooperation of the first or second control element region 21, 22 with the first or second orifice region 41, 42. The effect of the invention lies in the fact that in the closed position of the control valve 3, the control pressure p2 prevailing in the control chamber (in a first position) acts on a first (small) control surface 20a of the control element 2. The control surface 20a in this case is provided on the first control element region 21; this region protrudes into the orifice 4. In this position, the first control element region 21 cooperates in a sealing fashion with the first orifice region 41.

In a second, controlled position, in which the control element 2 is lifted (upward) away from the orifice 4, i.e. is partially opened, the control chamber 10 and the return chamber 11 are fluidically connected to each other. The control pressure p2 prevailing in the control chamber 10 in the second position in this case acts on a second control surface 20b, which is provided in the second control element region 22. The second control surface 20b is larger than the first control surface 20a.

The proposal according to the invention will be explained in greater detail, particularly with the aid of the model described below.

It should be noted here that the second control element region 22 cooperates with the second orifice region 42.

The embodiment here is selected so that the cooperation of the first and second control element regions 21, 22 with the corresponding first and second orifice regions 41, 42 produces an (additional) throttle region in the orifice 4, in fact particularly in the region of the larger, second control surface 20b. In this case, the larger control surface 20b is situated downstream of the first, smaller control surface 20a in the flow direction S and possibly also downstream of the resulting throttle produced by it, which with a differentiated approach can result in a pressure reduction.

The term "control pressure" that is defined and used in this application takes into account this possible pressure difference that can potentially occur here and includes it complete from a technical standpoint. Ideally in this model, the control pressure prevailing here is (effectively) the same as the pressure that is present against the (small) first control surface 20a.

FIG. 3 shows the progressive curve M of the control pressure p2 over the current I that is used to power the coil of the electromagnet 6. A characteristic for the progressive curve M of the pressure control valve according to the invention 1 here is the fact that the slope of the curve in the graph steadily increases with the increasing current, whereas with proportional magnets, the usual linear curve L has a constant slope and is invariable (=0) in the second derivative.

In this case, through the parameters of the control element region spacing f and the orifice region spacing g, in particular their ratio to each other, as well as through the selection of the ratio of the internal width/diameter b of the second orifice region 42 the internal width/diameter a of the first orifice region 41, the invention provides a plurality of design-related adjusting screws to adjust and optimize the progressiveness of the curve M.

The embodiment according to FIG. 2b differs from the one in FIG. 1b with regard to the special configuration of the first control element region 21 and of the corresponding first orifice region 41.

In the variant according to FIG. 1b, the first orifice region 41 is embodied as a disk-shaped or flat seat; the control element region 21 that cooperates with it is embodied in the form of a valve disk.

In FIG. 2b here, the first control element region 21 is embodied in the form of a truncated valve cone 29, which cooperates with a corresponding conical seat 49, i.e. a first orifice region 41. The truncated valve cone 29, which constitutes the first control element region 21, is in turn adjoined at the downstream end by a cylindrical intermediate control element region 23 that connects the control element region 21 to the second control element region 22, which is embodied in the form of a disk valve.

The orifice 4 in turn contains an annular shoulder 46 between the second orifice region with the larger diameter b and the first orifice region with the smaller diameter a. The arrangement of the conical seat 49 is now selected so that this conical seat does not extend across the entire transition from the small diameter a to the large diameter b, but instead extends across less than half, in particular less than 40 or 30% of this difference.

Otherwise, the intermediate orifice region 43 is composed of a cylindrical opening in this case as well.

The present filing of claims with the patent application and subsequent filing of claims are without prejudice to seeking further protection.

If upon closer examination, in particular also of the relevant prior art, it is shown that one feature or another is advantageous for the objective of the invention but not crucially important, it is understood that a wording is sought which no longer has such a feature, in particular in the main claim. Such a subcombination is also encompassed by the disclosure of the present patent application.

It is further noted that the forms and variants of the invention described in the various embodiments and shown in the figures may be arbitrarily combined with one another. In this regard, individual or multiple features may be arbitrarily replaced with one another. These feature combinations are likewise disclosed herein.

The back-references stated in the dependent claims refer to the further embodiment of the subject matter of the main claim through the features of the respective subclaim. However, this is not to be construed as forgoing the seeking of independent, objective protection for the features of the back-referenced subclaims.

Features which have been disclosed only in the description, or also individual features of claims which include a plurality of features, may be incorporated at any time into the independent claim or claims as having importance essential to the invention for delimitation from the prior art, even if such features have been mentioned in conjunction with other features, or achieve particularly advantageous results in conjunction with other features.

The invention claimed is:

1. A pressure control valve, comprising:
   a valve component comprising:
      a control chamber having a control pressure,
      a return chamber having a return pressure,
      an orifice extending solely between the control chamber and the return chamber and having a longitudinal axis and comprising at least a first orifice region in a direction of the longitudinal axis and a second orifice region in the direction of the longitudinal axis, the orifice regions spaced apart from each other and having different respective cross-sectional areas,
      a control element comprising at least a first control element region, including a first control surface, and a second control element region, including a second control surface, the control element regions spaced apart from each other in the direction of the longitudinal axis and having different respective cross-sectional areas, such that the second control surface is larger than the first control surface, wherein the first control surface protruding into the orifice cooperates with the first orifice region to close the orifice, thereby preventing flow between the control chamber and the return chamber, and the second control surface cooperates with the second orifice region to control pressure between the control chamber and the return chamber, and a drive component for the control element, wherein, during operation of the control valve, the first control surface and a surface of the first orifice region remain parallel to each other, and the second control surface and a surface of the second orifice region remain parallel to each other.

2. The pressure control valve of claim 1, wherein, depending on the position of the drive component and the control element operatively connected to the drive component, the orifice is at least one of closed by the drive component and at least partially open for pressure control purposes.

3. The pressure control valve of claim 1, wherein a section having a uniform cross-sectional area is situated between the first and second control surfaces.

4. The pressure control valve of claim 1, wherein a control surface spacing between the first control surface and the second control surface is greater than an orifice region spacing between the first orifice region and the second orifice region.

5. The pressure control valve of claim 1, wherein at least one orifice region is embodied as at least one of a disk-shaped seat and a flat seat.

6. The pressure control valve of claim 1, wherein at least one control surface is embodied as a valve disk.

7. The pressure control valve of claim 1, wherein at least one of an internal width of the second orifice region and a diameter of the second orifice region forms a ratio of at least 1.4 with at least one of a respective internal width of the first orifice region and a diameter of the first orifice region.

8. The pressure control valve of claim 1, wherein the valve component is selected from the group consisting of: metal, steel, brass, and plastic.

9. The pressure control valve of claim 1, wherein the valve component has another sub-valve, which, in a closed position, disconnects the control chamber from a connection.

10. An electromagnetically actuated pressure control valve comprising the pressure control valve of claim 1, wherein the drive component is an electromagnet, whose armature rod is at least one of connected to and operatively connected to the control element.

11. The pressure control valve of claim 1, wherein a section having a uniform cross-sectional area is situated between the first and second orifice regions.

12. The pressure control valve of claim 1, wherein the first and second control surface adjoin each other and are characterized by an abrupt, discontinuous change in the cross-sectional area.

13. The pressure control valve of claim 1, wherein the first and second orifice regions adjoin each other and are characterized by an abrupt, discontinuous change in the cross-sectional area.

14. The pressure control valve of claim 1, wherein at least one orifice region is embodied as a conical seat.

15. The pressure control valve of claim 1, wherein the pressure control valve generates a progressive pressure control characteristic curve during operation.

16. The pressure control valve of claim 4, wherein a ratio of the control element region spacing to the orifice region spacing is between 1 and 3.

17. The pressure control valve of claim 16, wherein the ratio of the control element region spacing to the orifice region spacing is between 1 and 2.

18. The pressure control valve of claim 16, wherein the ratio of the control element region spacing to the orifice region spacing is between 1.2 and 1.4.

19. The pressure control valve of claim 5, wherein another of the at least one orifice regions is embodied as a conical seat.

20. The pressure control valve of claim 6, wherein another of the control surfaces is embodied as at least one of a valve cone and a truncated valve cone.

21. A pressure control valve, comprising:
a valve component comprising:
a control chamber having a control pressure,
a return chamber having a return pressure,
an orifice extending solely between the control chamber and the return chamber and having a longitudinal axis and comprising at least a first orifice region in a direction of the longitudinal axis and a second orifice region in the direction of the longitudinal axis, the orifice regions spaced apart from each other and having different respective cross-sectional areas,
a control element comprising at least a first control element region, including a first control surface, and a second control element region, including a second control surface, the control element regions spaced apart from each other in the direction of the longitudinal axis and having different respective cross-sectional areas, such that the second control surface is larger than the first control surface,
wherein the first control surface protruding into the orifice cooperates with the first orifice region to close the orifice, thereby preventing flow between the control chamber and the return chamber, and the second control surface cooperates with the second orifice region to control pressure between the control chamber and the return chamber, and
a drive component for the control element,
wherein during operation of the control valve, the control pressure is greater than or equal to the return pressure, and
(i) in a first position, the orifice is closed by the control element, such that the first control surface and a surface of the first orifice region remain parallel to each other, preventing fluid communication between the control chamber and the return chamber and the control pressure acts on the first control surface, and
(ii) in a second, controlled position, the orifice is partially open, such that the second control surface and a surface of the second orifice region remain parallel to each other, the control chamber and the return chamber are in fluid communication, and the control pressure acts on the second control surface, such that a distance between the first control surface and the second control surface is greater than a distance between the first orifice region and the second orifice region.

* * * * *